V. E. NICOLAIDES.
IRRIGATION VALVE.
APPLICATION FILED NOV. 20, 1913.
1,122,795.
Patented Dec. 29, 1914.
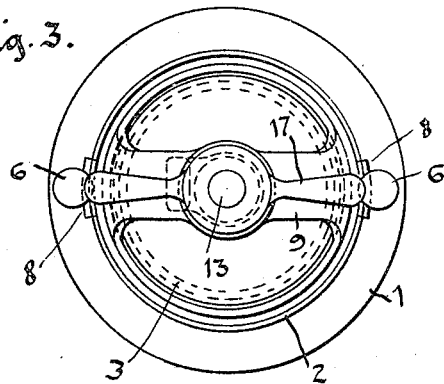
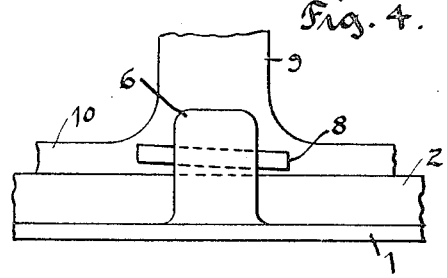
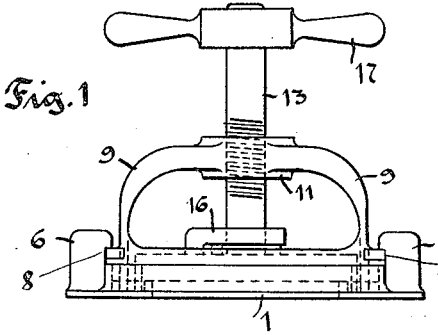
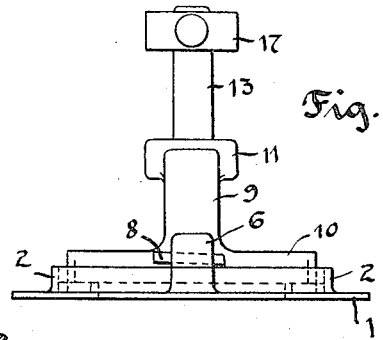
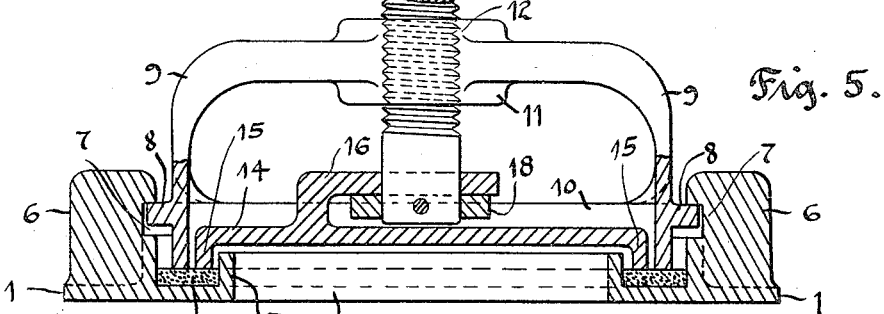

UNITED STATES PATENT OFFICE.

VICTOR E. NICOLAIDES, OF SAN GABRIEL, CALIFORNIA.

IRRIGATION-VALVE.

1,122,795.

Specification of Letters Patent.

Patented Dec. 29, 1914.

Application filed November 20, 1913. Serial No. 802,174.

*To all whom it may concern:*

Be it known that I, VICTOR E. NICOLAIDES, a citizen of the United States, residing at San Gabriel, in the county of Los Angeles and State of California, have invented certain new and useful Improvements in Irrigation-Valves, of which the following is a complete specification, whereby any one skilled in the art to which it appertains may make and use the same.

My invention relates to that class of irrigation valves which are usually attached to cement or tile pipes, but they may be attached to pipes of metal or other material. In this system of irrigation the main supply pipes are generally placed below the level of the ground with risers located at frequent intervals along the line of the main pipe, said risers being provided with overflow irrigation valves cemented to their tops so that the field may be irrigated with water overflowing from these risers through the said irrigating valves.

The object of my invention is to provide a valve which can be made at less cost than the usual type of valve, and one in which the overflow can be regulated and set to any desired amount, or the entire valve can be readily removed by one turn of the hand, without the use of wrenches or other tools.

I attain these objects by the mechanism illustrated in the accompanying drawings, in which:—

Figure 1 is a side elevation of the valve looking toward the side of the yoke handle and locking wedges. Fig. 2 is a side elevation of the valve looking toward the edge of the yoke and handle. Fig. 3 is a plan view of the valve. Fig. 4 is an enlarged partial view of the side of the valve, showing one of the wedges. Fig. 5 is an enlarged partial side view of the valve broken away on its central longitudinal section.

Similar numerals refer to similar parts throughout the several views.

The valve consists of a base 1, having raised upon its upper surface an outer annular flange 2, and an inner annular flange 3, both surrounding the central water opening 4. In the annular recesses between the two flanges 2 and 3, is placed the packing ring 5, of sheet rubber or other suitable material. Located around the periphery of the outer annular flange 2, are two or more posts 6, said posts being provided on their inner sides with slots 7, suitable to receive the wedges 8 of the yoke 9. Resting upon the packing ring 5 is a yoke consisting of an annular vertical ring 10, having integral with it the yoke 9 connecting its two sides and having on its upper surface the boss 11, said boss being provided with a screw thread 12 to receive the adjusting screw 13. Around the sides of the annular yoke ring 10 are placed two or more wedges 8, so arranged as to engage in the slots 7 of the posts 6 whenever the yoke is rotated in the direction of inclination of the said wedge 8. Also resting upon the packing 5 is a valve 14 consisting of a plate with a downwardly projecting ring 15 and having on its upper surface a lug 16 provided with a suitable hole to receive the adjusting screw 13. The adjusting screw consists of a shaft 13 threaded to suit the hole 12 in the yoke 9 and provided at its upper end with a handle 17, said handle being attached in such a manner that it will rotate integrally with the said shaft 13. The shaft 13 projects downwardly through the hole in the lug 16 and has attached to its lower end by a pin or other convenient means a collar 18 which permits it to revolve freely in the lug 16 and at the same time to raise or lower the valve 14 as the screw is turned up or down.

The operation of my invention is as follows: The base 1 having been cemented or otherwise attached in a water-tight manner to the water supply pipe or valve 14 and the adjusting screw 13 having been assembled in position in the yoke 9, and the screw 13 having been unscrewed so that the valve 14 is in its upper position, the group of parts, consisting of yoke, valve, screw, handle and collar are then placed in position resting on the packing ring 5, but with the inclined wedge 8 at one side of the posts 6; the entire group is then rotated, thus operating the wedges 8 into engagement with the slots 7 in the posts 6, and by still further rotating the said group the inclination of the wedges 8 causes the ring 10 of the yoke to form a water-tight joint on the packing 5. The valve 14 can then be adjusted to any desired degree of lift by raising or lowering it by means of the screw 13 and handle 17, the screw 13 having sufficient friction so that it will remain in whatever position it is set. It will thus be seen that if it is desired to entirely shut off the flow of water, this may be done by screwing the valve down until it forms a water-tight bearing on the packing ring 5. The amount of flow is regulated by the amount of lift given the valve 14. In case it is desired to open the valve to its full pipe opening all that is necessary is a slight turn of the combined group of yoke, valve and screw, when the said group can be entirely lifted out of the valve base.

What I desire to claim as my invention and to secure by Letters Patent of the United States, is:—

1. In an irrigating valve the combination of a base having an annular recess provided with a packing ring, a yoke capable of being attached or detached to or from said base and having an annular ring adapted to press on said packing ring, a valve adapted to seat on said packing ring and a screw in said yoke adapted to raise or lower said valve, all substantially as shown and described.

2. In an irrigating valve the combination of a base provided with an annular recess containing a packing ring, said base also being provided with two upright bosses having horizontal slots on their interior sides, a yoke having an annular ring adapted to press on said packing ring and wedge-shaped lugs adapted on rotation to engage with said slots in said bosses; a disk-shaped valve adapted to seat on said packing ring; and a screw revolubly attached to said valve and threaded in said yoke for the purpose of raising or lowering said valve, all substantially as shown and described.

VICTOR E. NICOLAIDES.

Witnesses:
BERT C. LOWE,
FRANK P. SNOW.